Jan. 16, 1940.  W. C. SHORT ET AL  2,186,996
WHEEL STRUCTURE
Filed Jan. 23, 1939
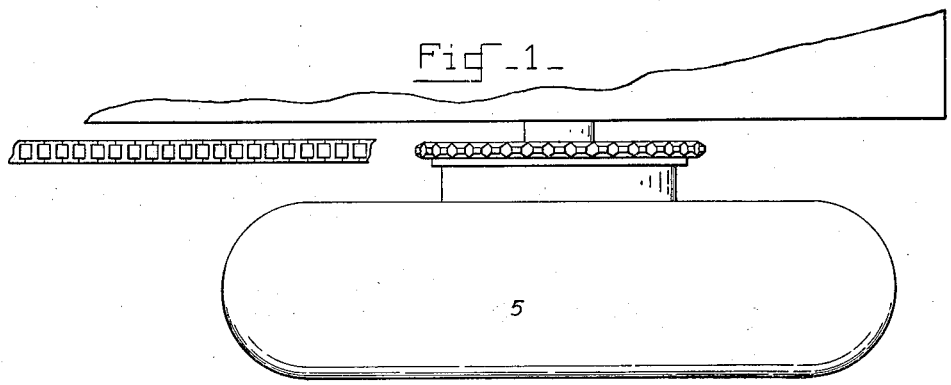
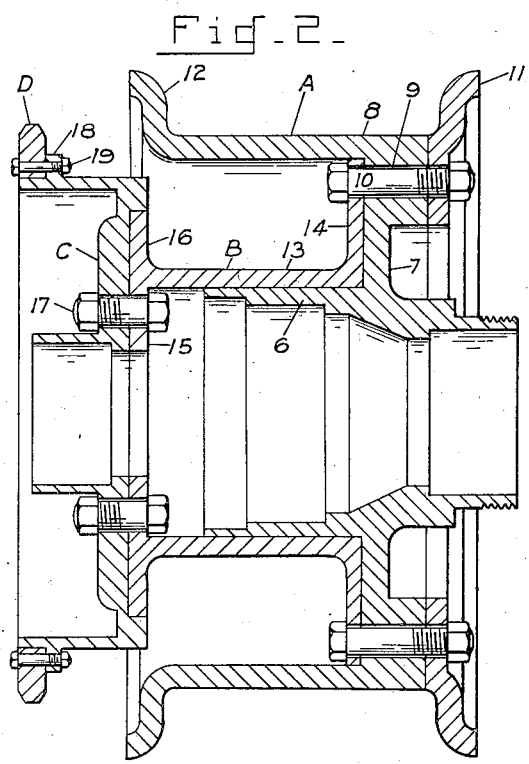
Inventors
Walter C. Short
Robert G. Howie
Melvin C. Wiley
By Kessenich & Church
Attorneys Patented Jan. 16, 1940

2,186,996

UNITED STATES PATENT OFFICE 2,186,996

WHEEL STRUCTURE

Walter C. Short, Fort Hamilton, N. Y., and Robert G. Howie and Melvin C. Wiley, Fort Benning, Ga.

Application January 23, 1939, Serial No. 252,413

1 Claim. (Cl. 301—6)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a wheel structure especially adapted for a military vehicle of the type shown in our copending application, Serial No. 252,412 filed January 23, 1939.

The purpose of the invention is to provide a chain driven wheel which may be readily constructed from elements of commercial type vehicles and adapted to meet the requirements of a special situation.

The specific nature of the invention as well as other objects and advantages thereof will clearly appear from a description of a preferred embodiment as shown in the accompanying drawing in which:

Fig. 1 is a plan view of a portion of a vehicle showing the application of the improved chain driven wheel.

Fig. 2 is a sectional view of the wheel with the parts in assembled relation.

Referring to the drawing by characters of reference the wheel structure comprises a wheel A, an adapter B, a brake drum C and a sprocket D.

The wheel A is of a standard commercial type for tractors adapted to carry a pneumatic tire 5 and consists of a hub 6, a disk 7, and a rim 8, all integral. The disk 7 is formed with apertures 9 for receiving bolts 10 which serve to retain a removable ring 11 corresponding to the integral flange 12 of the rim.

The inner portion of the hub is spaced from the rim and provides an annular chamber which is laterally closed on the outer side of the wheel by the disk 7. The adapter B consists of a cylinder 13 dimensioned to fit on the inner portion of the hub and it has an external flange 14 at its outer end arranged to fit against the disk 7. The flange 14 has apertures for receiving the bolts 10.

The inner end of the adapter is formed with an internal flange 15 and an external flange 16 to provide a seat of large area for the adjacent face of the brake drum C. Bolts 17 passing through the flange 14 and the brake drum secure the drum to the adapter. The brake drum is of a standard type for motorcycles.

The sprocket D embraces the brake drum and is secured to a flange 18 on the drum by means of bolts 19.

We claim:

A wheel structure comprising a wheel including a hub and rim and a connecting disk, a cylindrical adapter mounted on the hub and having an external flange on one end, means passing through the connecting disk and said flange to hold the adapter in place, an internal and external flange on the other end of the adapter, a brake drum facing on the internal and external flanges of said other end, means passing through the internal flange and the brake drum to hold the brake drum in place, and a sprocket carried by the brake drum.

WALTER C. SHORT.
ROBERT G. HOWIE.
MELVIN C. WILEY.